(12) United States Patent
Nesmith

(10) Patent No.: US 8,339,418 B1
(45) Date of Patent: Dec. 25, 2012

(54) EMBEDDING A REAL TIME VIDEO INTO A VIRTUAL ENVIRONMENT

(75) Inventor: Michael Nesmith, Sand City, CA (US)

(73) Assignee: Pacific Arts Corporation, Sand City, CA (US)

( * ) Notice: Subject to any disclaimer, the term of this patent is extended or adjusted under 35 U.S.C. 154(b) by 630 days.

(21) Appl. No.: 11/823,100

(22) Filed: Jun. 25, 2007

(51) Int. Cl.
*G09G 5/36* (2006.01)

(52) U.S. Cl. .................................... 345/633

(58) Field of Classification Search ............ 345/633
See application file for complete search history.

(56) References Cited

U.S. PATENT DOCUMENTS

| | | | | |
|---|---|---|---|---|
| 5,696,892 A * | 12/1997 | Redmann et al. | | 345/582 |
| 5,745,126 A * | 4/1998 | Jain et al. | | 382/154 |
| 5,754,170 A * | 5/1998 | Ranganathan | | 345/558 |
| 5,764,201 A * | 6/1998 | Ranganathan | | 345/3.3 |
| 5,940,139 A * | 8/1999 | Smoot | | 348/584 |
| 6,064,398 A * | 5/2000 | Ellenby et al. | | 345/633 |
| 6,201,579 B1 * | 3/2001 | Tamir et al. | | 348/579 |
| 6,335,765 B1 * | 1/2002 | Daly et al. | | 348/586 |
| 6,348,953 B1 * | 2/2002 | Rybczynski | | 348/584 |
| 6,402,615 B1 * | 6/2002 | Takeuchi | | 463/31 |
| 6,452,593 B1 * | 9/2002 | Challener | | 345/419 |
| 6,657,637 B1 * | 12/2003 | Nishigori et al. | | 345/629 |
| 6,697,072 B2 * | 2/2004 | Russell et al. | | 345/474 |
| 6,948,131 B1 * | 9/2005 | Neven et al. | | 715/753 |
| 7,027,659 B1 * | 4/2006 | Thomas | | 382/254 |
| 7,081,898 B2 * | 7/2006 | Sevigny | | 345/589 |
| 7,315,241 B1 * | 1/2008 | Daily et al. | | 340/525 |
| 7,315,646 B2 * | 1/2008 | Pettigrew | | 382/173 |
| 7,479,967 B2 * | 1/2009 | Bachelder et al. | | 345/592 |
| 7,532,111 B2 * | 5/2009 | LaRue | | 340/539.1 |
| 7,671,321 B2 * | 3/2010 | Perlman et al. | | 250/216 |
| 7,760,804 B2 * | 7/2010 | Ruttenberg et al. | | 375/240.12 |
| 7,837,330 B2 * | 11/2010 | Montgomery et al. | | 353/7 |
| 8,038,304 B2 * | 10/2011 | Mizuuchi et al. | | 353/79 |
| 2001/0001242 A1 * | 5/2001 | Tamir et al. | | 345/435 |
| 2001/0017667 A1 * | 8/2001 | Frink et al. | | 348/458 |
| 2002/0024519 A1 * | 2/2002 | Park | | 345/474 |
| 2002/0075286 A1 * | 6/2002 | Yonezawa et al. | | 345/679 |
| 2002/0145610 A1 * | 10/2002 | Barilovits et al. | | 345/538 |
| 2002/0154122 A1 * | 10/2002 | Di Lelle | | 345/467 |
| 2003/0043144 A1 * | 3/2003 | Pundarika et al. | | 345/419 |
| 2003/0043152 A1 * | 3/2003 | Raskar | | 345/473 |
| 2003/0067536 A1 * | 4/2003 | Boulanger et al. | | 348/14.08 |
| 2003/0077556 A1 * | 4/2003 | French et al. | | 434/258 |
| 2003/0218638 A1 * | 11/2003 | Goose et al. | | 345/850 |
| 2004/0233987 A1 * | 11/2004 | Porikli et al. | | 375/240.16 |

(Continued)

OTHER PUBLICATIONS

A combined studio production system for 3-D capturing of live action and immersive actor feedback Grau, O.; Pullen, T.; Thomas, G.A.; Circuits and Systems for Video Technology, IEEE Transactions on vol. 14, Issue: 3 Digital Object Identifier: 10.1109/TCSVT.2004.823397 Publication Year: 2004, pp. 370-380.*

(Continued)

*Primary Examiner* — Javid A Amini

(74) *Attorney, Agent, or Firm* — Van Pelt, Yi & James LLP

(57) ABSTRACT

Generating combined content suitable for including in a virtual environment is disclosed. A background associated with the virtual environment is inputted. A real time video is inputted. The background is combined with the real time video to generate combined content. The combined content is suitable for including in the virtual environment.

35 Claims, 7 Drawing Sheets

U.S. PATENT DOCUMENTS

| | | | | |
|---|---|---|---|---|
| 2005/0185711 | A1* | 8/2005 | Pfister et al. | 375/240.01 |
| 2005/0215879 | A1* | 9/2005 | Chuanggui | 600/407 |
| 2005/0225559 | A1* | 10/2005 | Robertson et al. | 345/581 |
| 2005/0289472 | A1* | 12/2005 | Morita et al. | 715/757 |
| 2006/0161572 | A1* | 7/2006 | Vogt et al. | 707/101 |
| 2006/0195787 | A1* | 8/2006 | Topiwala et al. | 715/700 |
| 2006/0223637 | A1* | 10/2006 | Rosenberg | 463/47 |
| 2006/0232499 | A1* | 10/2006 | Ebersole et al. | 345/7 |
| 2006/0245655 | A1* | 11/2006 | Suino et al. | 382/232 |
| 2006/0279630 | A1* | 12/2006 | Aggarwal et al. | 348/143 |
| 2007/0000374 | A1* | 1/2007 | Clark et al. | 84/724 |
| 2007/0003131 | A1* | 1/2007 | Kaufman | 382/154 |
| 2007/0035561 | A1* | 2/2007 | Bachelder et al. | 345/633 |
| 2007/0070066 | A1* | 3/2007 | Bakhash | 345/419 |
| 2007/0094698 | A1* | 4/2007 | Bountour et al. | 725/132 |
| 2007/0132785 | A1* | 6/2007 | Ebersole et al. | 345/633 |
| 2007/0139418 | A1* | 6/2007 | Abel et al. | 345/474 |
| 2007/0163427 | A1* | 7/2007 | Rigopulos et al. | 84/609 |
| 2007/0168413 | A1* | 7/2007 | Barletta et al. | 709/203 |
| 2007/0195162 | A1* | 8/2007 | Graff et al. | 348/47 |
| 2007/0220435 | A1* | 9/2007 | Sriprakash et al. | 715/757 |
| 2007/0238981 | A1* | 10/2007 | Zhu et al. | 600/424 |
| 2007/0247525 | A1* | 10/2007 | Samarasekera et al. | 348/159 |
| 2007/0263119 | A1* | 11/2007 | Shum et al. | 348/371 |
| 2007/0279494 | A1* | 12/2007 | Aman et al. | 348/169 |
| 2007/0291034 | A1* | 12/2007 | Dones | 345/427 |
| 2008/0005702 | A1* | 1/2008 | Skourup et al. | 715/848 |
| 2008/0028341 | A1* | 1/2008 | Szeliski et al. | 715/854 |
| 2008/0043038 | A1* | 2/2008 | Frydman | 345/632 |
| 2008/0046953 | A1* | 2/2008 | Kossila | 725/132 |
| 2008/0077953 | A1* | 3/2008 | Fernandez et al. | 725/32 |
| 2008/0113797 | A1* | 5/2008 | Egozy | 463/35 |
| 2008/0132331 | A1* | 6/2008 | Gatto et al. | 463/31 |
| 2008/0180519 | A1* | 7/2008 | Cok | 348/14.02 |
| 2008/0187896 | A1* | 8/2008 | Savitsky | 434/272 |
| 2008/0232778 | A1* | 9/2008 | Lin et al. | 386/117 |
| 2008/0243521 | A9* | 10/2008 | Coale et al. | 705/1 |
| 2008/0246759 | A1* | 10/2008 | Summers | 345/420 |
| 2008/0280276 | A1* | 11/2008 | Raber et al. | 434/236 |
| 2008/0291279 | A1* | 11/2008 | Samarasekera et al. | 348/159 |
| 2009/0073034 | A1* | 3/2009 | Lin | 342/357.07 |
| 2009/0207322 | A1* | 8/2009 | Mizuuchi et al. | 348/745 |
| 2009/0238378 | A1* | 9/2009 | Kikinis et al. | 381/92 |
| 2009/0256904 | A1* | 10/2009 | Krill et al. | 348/47 |
| 2009/0315978 | A1* | 12/2009 | Wurmlin et al. | 348/43 |
| 2010/0060632 | A1* | 3/2010 | Lefevre et al. | 345/419 |
| 2010/0146052 | A1* | 6/2010 | Pare et al. | 709/204 |
| 2010/0245387 | A1* | 9/2010 | Bachelder et al. | 345/633 |
| 2011/0029907 | A1* | 2/2011 | Bakhash | 715/769 |

OTHER PUBLICATIONS

Integrating Communication with Interaction: Computer Vision Challenges for Interactive and Intelligent Environments cooperstock, J.R.; Computer Vision for Interactive and Intelligent Environment, 2005 Digital Object Identifier: 10.1109/CVIIE.2005.10 Publication Year: 2005 , pp. 151-161.*

Immersive video Moezzi, S.; Katkere, A.; Kuramura, D.Y.; Jain, R.; Virtual Reality Annual International Symposium, 1996., Proceedings of the IEEE 1996 Digital Object Identifier: 10.1109/VRAIS.1996.490506 Publication Year: 1996 , pp. 17-24, 265.*

Video avatar: embedded video for collaborative virtual environment Yura, S.; Usaka, T.; Sakamura, K.; Multimedia Computing and Systems, 1999. IEEE International Conference on vol. 2 Digital Object Identifier: 10.1109/MMCS.1999.778485 Publication Year: 1999 , pp. 433-438 vol. 2.*

* cited by examiner

EMBEDDING A REAL TIME VIDEO INTO A VIRTUAL ENVIRONMENT

BACKGROUND OF THE INVENTION

Three-dimensional virtual environments allow users to experience and interact with virtual objects. For example, users can communicate with one another as avatars in the virtual environment. Often the virtual objects are simplified graphical representations of persons or things. However, to create a more real life like illusion in the virtual environment, it would be desirable to also realistically reproduce the real live objects within the virtual environment. Therefore, there exists a need for a way to integrate real live objects into a virtual environment.

BRIEF DESCRIPTION OF THE DRAWINGS

Various embodiments of the invention are disclosed in the following detailed description and the accompanying drawings.

DETAILED DESCRIPTION

Figure 1:
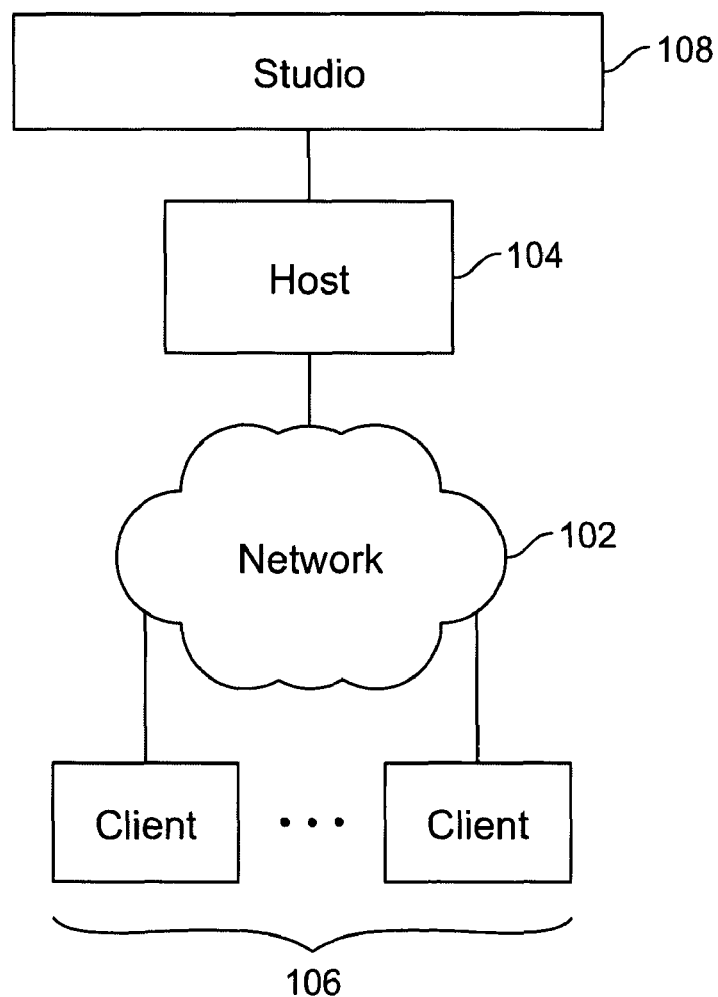
FIG. 1 is a block diagram illustrating an embodiment of networked systems at least in part used to implement a virtual environment.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embedding a real time video into a three-dimensional virtual environment is disclosed. In some embodiments, a background associated with the virtual environment is composited with the real time video to generate composited content suitable for embedding in the virtual environment. The composited content includes the combined video and background image. For example, the video includes a video of one or more real live objects against a chroma key background (e.g., bluescreen). The chroma key background portion of the video is replaced with a portion of the background image. In some embodiments, by positioning, scaling, and/or coloring the composited content when embedding the content in the virtual environment, the background included the composited content seamlessly blends into the virtual environment. One or more subjects of the video shown on the screen appear to a user as one or more objects existing in the virtual environment.

In some embodiments, a user is able to interact with the one or more subjects in the composited content. For example, the real time video may include a musical performance filmed against a chroma key background. The video is combined with a background image of a virtual environment performance stage backdrop. The combined video is placed on a virtual environment performance stage. To a user in the virtual environment, the musical performance of the video appears as if the musical performance is taking place on the virtual environment performance stage. In some embodiments, a camera angle used when producing the video, a scaling of the subject in the video, and/or arrangement of one or more objects in the virtual environment is specifically selected to maintain the illusion the musical performance is taking place on the virtual environment performance stage. The user in the virtual environment is represented by an avatar in the virtual environment. The avatar can interact with the musical performance through (1) actions of the avatar and (2) communications such as a text based chat and/or a voice based chat with one or more performers of the musical performance. The performers are able to view the actions avatar and communicate back with the avatars through gestures, the text based chat, and/or the voice based chat.

FIG. 1 is a block diagram illustrating an embodiment of networked systems at least in part used to implement a virtual environment. Network 102 connects host 104 with one or more clients 106. Network 102 comprises a public or private network and/or combination thereof, for example an Ethernet, serial/parallel bus, intranet, Internet, NAS, SAN, LAN, WAN, and other forms of connecting multiple systems and/or groups of systems together. Two clients are shown as an example. Any number of clients may be connected to network 102. Each client of clients 106 is used by a user to access the virtual environment. For example, each client includes a software for accessing the virtual environment. The virtual environment includes a computer generated three-dimension graphical environment that can be navigated by a user. For example, an avatar that represents the user can move around the virtual environment. Host 104 provides at least a portion of one or more virtual environment components to clients 106. For example, host 104 provides one or more virtual objects in the virtual environment to clients 106 and manages at least a portion of interactions with the virtual objects. In some embodiments, managing the interactions includes receiving interaction data from one of the clients and informing a real live video subject and/or other clients of the interaction data. In some embodiments, host 104 provides a composited real live video to clients 106. At least a portion of the composited data is obtained from studio 108. For example, studio 108 includes one or more real live data capture equipment such as a video camera and a microphone. In some embodiments, studio 108 includes an interface that allows a subject being filmed (e.g., a performer) to experience the virtual environment (e.g., view virtual environment user avatars from a point-of-view of a performer) and/or interact with one or more users of the virtual environment.

Figure 2:
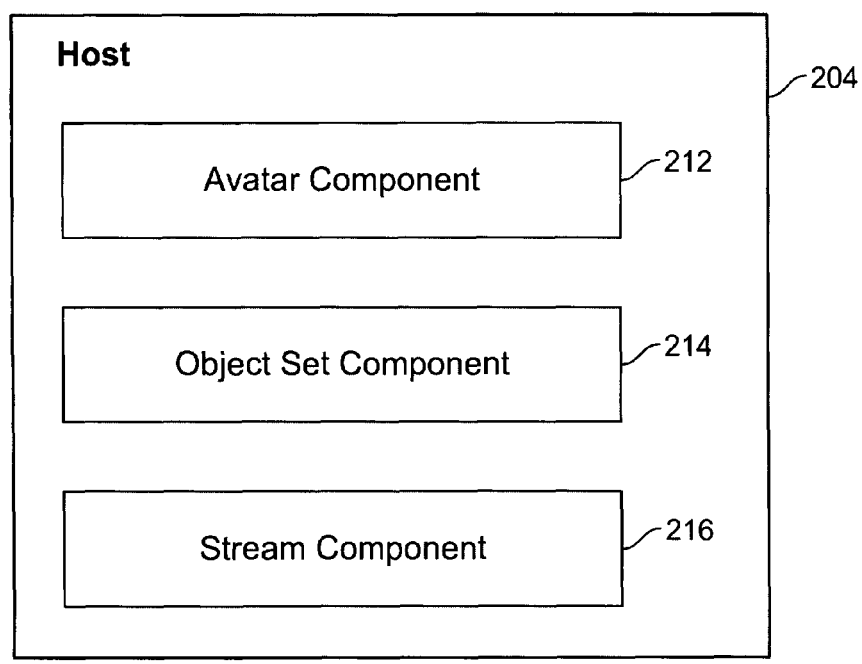
FIG. 2 is a block diagram illustrating an embodiment of a virtual environment host.

FIG. 2 is a block diagram illustrating an embodiment of a virtual environment host. In some embodiments, host 104 of FIG. 1 includes host 204. Host 204 includes avatar component 212, object set component 214, and stream component 216. Other components may exist in host 204. Avatar component 212 provides, receives, and/or manages data associated with one or more avatars in the virtual environment. For example, one or more avatars controlled by one or more corresponding users is, at least in part, managed and/or provided by avatar component 212 for clients 106 of FIG. 1. Object set component 214 provides, receives, and/or manages data associated with one or more virtual objects in the virtual environment. For example, virtual objects such as building structures and landscape structures are, at least in part, managed and/or provided by object set component 214 for clients 106 of FIG. 1. Stream component 216 provides, receives, and/or manages data associated with a real live streamable data. For example, a composited real live video is, at least in part, streamed by stream component 216 to clients 106 of FIG. 1.

Figure 3:
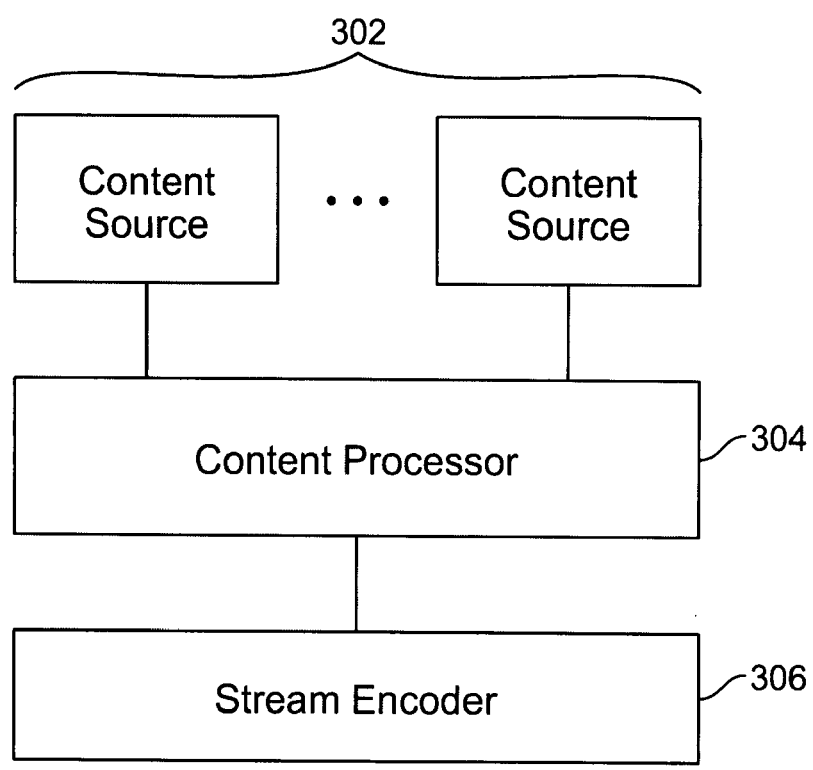
FIG. 3 is block diagram illustrating an embodiment of a system for encoding a data stream.

FIG. 3 is block diagram illustrating an embodiment of a system for encoding a data stream. In some embodiments, the objects of FIG. 3 are included in studio 108 of FIG. 1. One or more content sources 302 are connected to content processor 304. Examples of a content source include video data, audio data, image data, animation data, text data, and virtual object data. Content processor 304 processes output from one or more content sources of content sources 302. For example, content processor 304 combines at least a portion of two content sources such as replacing a chroma key background of a video content with desired background image content. Stream encoder 306 encodes at least a portion of an output of content processor 304 into a format suitable for streaming. For example, stream encoder 306 encodes the output of content processor 304 for transmission to one or more clients, such as clients 106 of FIG. 1.

Figure 4:
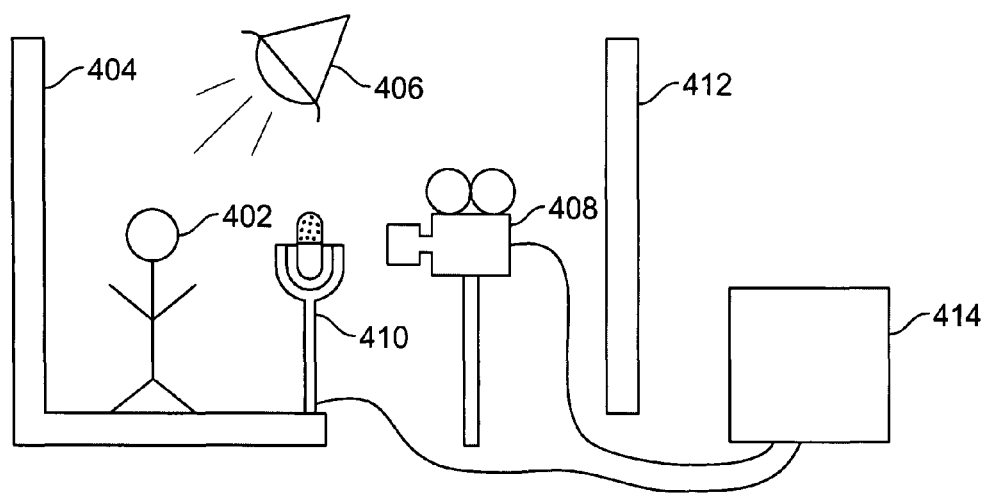
FIG. 4 is a diagram illustrating an embodiment of a real time video capture environment.

FIG. 4 is a diagram illustrating an embodiment of a real time video capture environment. In some embodiments, studio 108 of FIG. 1 includes at least a portion of objects shown in FIG. 4. Subject 402 is filmed against chroma key background 404. For example, chroma key background 404 is a bluescreen that allows a video captured against background 404 to be processed to replace the captured background with another desired background. In some embodiments, a chroma key colored occluding object exists in between subject 402 and camera 408. The filmed chroma key colored occluding object is replaced with another desired content such a virtual environment object. For example, when processing a video including a chroma key colored box occluding subject 402, the chroma key colored box is replaced with a virtual environment desk object. Lighting 406 lights subject 402. In some embodiments, lighting 406 is configured in a manner that substantially reproduces lighting effects of a light source in a virtual environment. For example, a video of subject 402 is to be placed near a virtual lighting source in the virtual environment. Lighting 406 creates a lighting effect (e.g., brightness effects, contrast effects, shadow effects) on subject 402 substantially similar to a lighting effect that would be produced by the virtual lighting source on subject 402 if subject 402 was in the virtual environment on the position of the video placement in the virtual environment. Video camera 408 and microphone 410 capture live data and provide the live data to processor 414. In some embodiments, a camera angle and magnification used by video camera 408 is selected to match a virtual environment that will include at least a portion of a video output of video camera 408. In some embodiments, video camera 408 and microphone 410 are included in content source 302 of FIG. 3, and processor 414 includes content processor 304 of FIG. 3. In some embodiments, processor 414 at least in part includes and/or is connected to a host such as host 104 of FIG. 1. Content processor 414 allows in-production processing of the captured live data that allows the processed live video to be placed in the virtual environment.

Subject 402 is able to view and interact with the virtual environment at least in part by using screen 412. For example, screen 412 displays one or more of the following: a virtual environment, a virtual environment object, a representation of a virtual environment user (e.g., avatar), and a chat session. In some embodiments, a visual representation of subject 402 is placed in a virtual environment, and screen 412 displays the virtual environment that the representation of subject 402 would experience in the virtual environment. This allows subject 402 to see spatial movements, gestures, and existence of one or more users (e.g., avatars) in the virtual environment. In some embodiments, subject 402 communicates with one or more virtual environment users at least in part through information captured by video camera 408 and microphone 410 and/or at least in part by using an input device such as a keyboard, a cursor movement device, and any other input device. In some embodiments, subject 402 is able to navigate through the virtual environment using screen 412.

Figure 5:
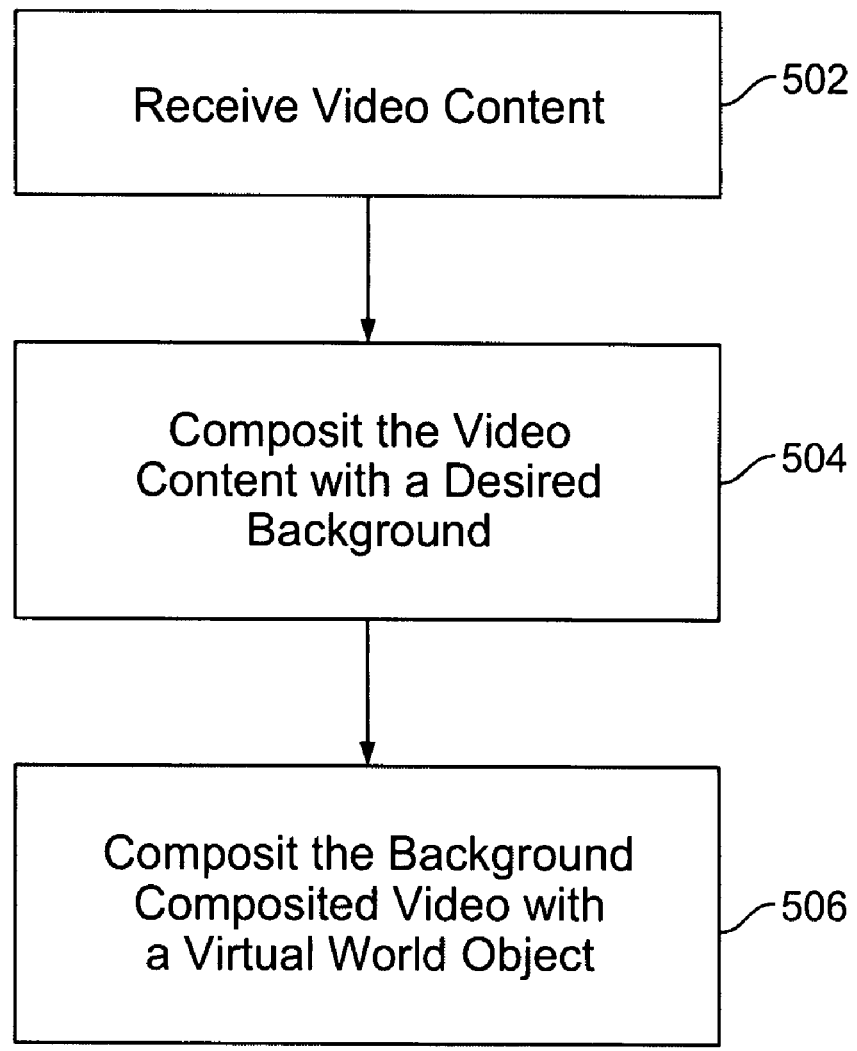
FIG. 5 is a flowchart illustrating an embodiment of a process for compositing content.

FIG. 5 is a flowchart illustrating an embodiment of a process for compositing content. At 502, video content is received. In some embodiments, receiving the video content includes receiving a live video. In some embodiments, the video includes a subject filmed against a chroma key background such as a bluescreen. In some embodiments, the video is obtained from video camera 408 of FIG. 4. At 504, the received video is composited with a desired background. In some embodiments, the desired background is obtained from a virtual environment. For example, a still image is captured from a backdrop of a performance stage object in a virtual environment. Examples of content included the desired background include one or more of the following: an image content, a video content, an animation content, a text content, and a virtual environment content. In some embodiments, compositing the video includes replacing a chroma key background of the received video content with the desired background. For example, at least a portion the video that is a specified range of color (e.g., chroma key color range) is replaced with the desired background. In various embodiments, compositing techniques other than using a chroma key background may be used to replace the background of the video content with a desired background. In some embodiments, the compositing in 504 is at least in part performed by content processor 304 of FIG. 3 and/or processor 414 of FIG. 4. In some embodiments, compositing the content includes adjusting a scale, a position, a color, an orientation, and/or a cropping of the video content and/or the desired background.

At 506, the background composited video content is composited with a virtual environment object. In some embodiments, compositing the composited video content with the virtual environment object includes associating together the composited video content with the virtual environment object. For example, a virtual environment screen that displays the composited video content is positioned with respect to a virtual environment object such as a virtual environment stage background. In some embodiments, compositing the video content includes adjusting a scale, a position, a color, and/or a cropping of the composited video content with respect to the virtual environment object. In some embodiments, the composited video is adjusted to substantially match the background of the composited video with at least a portion of the virtual environment object. This aids in creating an illusion that a subject of the composited video appears immersed in the virtual environment. In some embodiments, compositing the background composited video content with the virtual environment object includes processing (e.g. coloring, cropping, blurring) at least a portion an edge of the composited video to better blend in with the virtual environment object and/or the virtual environment. In some embodiments, at least a portion an edge of the composited video is positioned near a naturally occurring edge feature of the virtual environment object and/or the virtual environment. For example, an edge of the composited video is placed on an already existing edge between two different features in the virtual environment. The seam between the composited video and the virtual object is less noticeable to a user since the user already expects a visual transition in the already existing edge.

In some embodiments, the composited virtual environment object already exists in a virtual environment. In some embodiments, the composited virtual environment object is placed in a virtual environment. For example, the composited virtual environment object is sent by host 104 of FIG. 1 to at least one client of clients 106 of FIG. 1. The client renders the received composited virtual environment object at a specified location within the virtual environment. In some embodiments, the composited virtual environment object is placed at a specific location within the virtual environment that aids in maintaining an illusion that a subject of the received video is immersed in the virtual environment. In various embodiments, the process of FIG. 5 is performed live substantially during production of the live video content.

Figure 6:
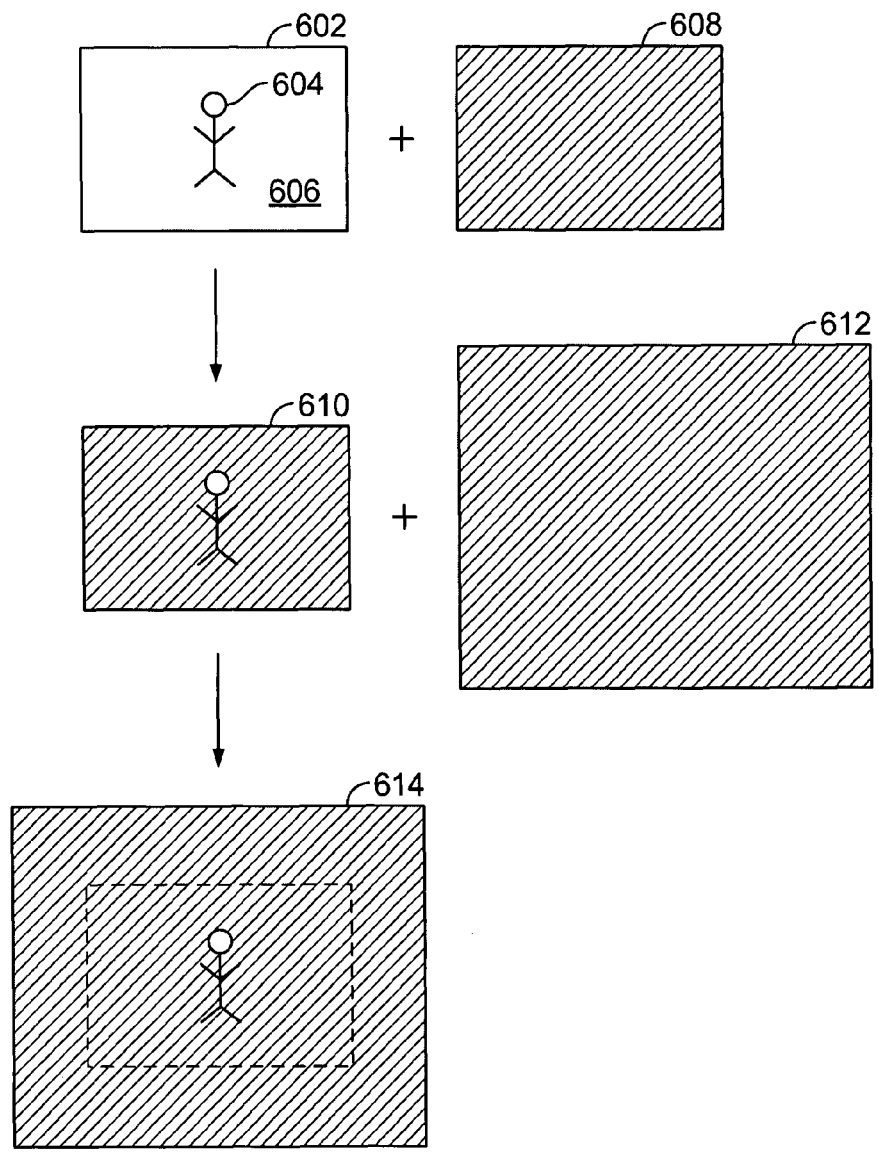
FIG. 6 is a diagram illustrating an embodiment of compositing content.

FIG. 6 is a diagram illustrating an embodiment of compositing content. In some embodiments, the diagram of FIG. 6 illustrates an example of the process of FIG. 5. Live video 602 includes subject 604 and background 606. Background 606 is from a chroma key background. Desired background 608 is composited with live video 602 to obtain desired background composited video 610. Compositing desired background 608 with live video 602 includes replacing background 606 with desired background 608 and adjusting a scale, a position, a color, an orientation, and/or a cropping of live video 602 and/or desired background 608. Composited video 610 is composited with virtual environment object 612 to produce composited virtual environment object 614. Compositing composited video 610 with virtual environment object 612 includes associating composited video 610 with virtual environment object 612 and adjusting a scale, a position, a color, and/or a cropping composited video 610 with respect to virtual environment object 612. Desired background 608 includes an image captured using virtual environment object 614, and compositing composited video 610 with virtual environment object 612 includes aligning together composited video 610 and virtual environment object 612. In some embodiments, compositing composited video 610 with virtual environment object 612 includes processing the edges of composited video 610 to better blend the video edges with virtual environment object 612.

Figure 7:
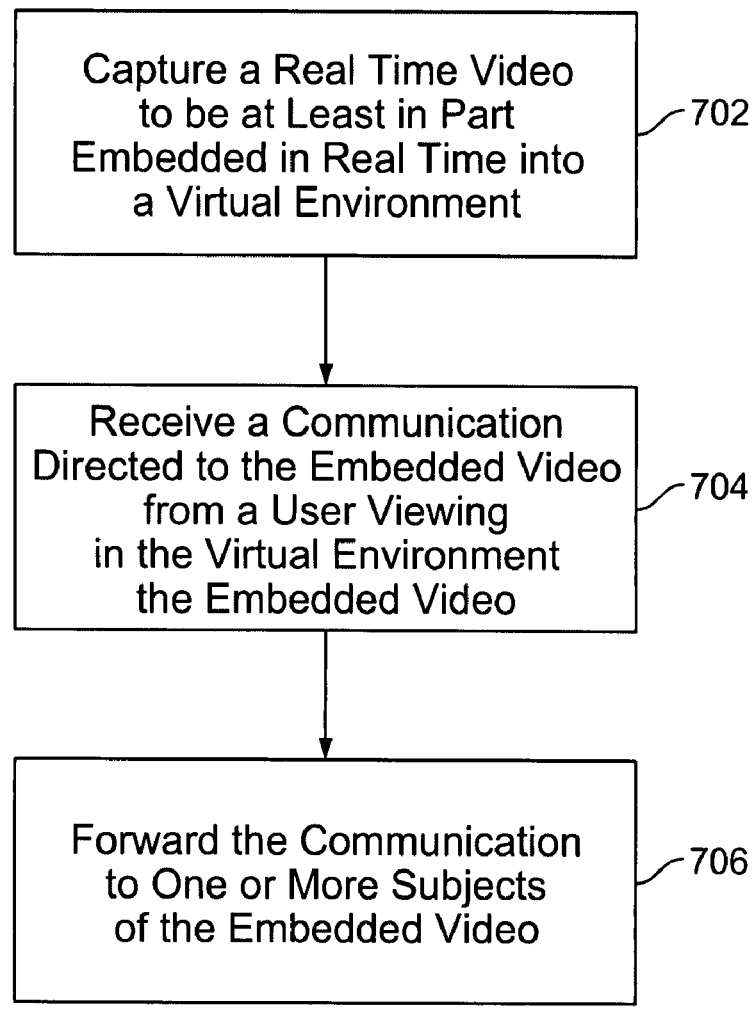
FIG. 7 is flowchart illustrating an embodiment of a process for receiving a communication.

FIG. 7 is flowchart illustrating an embodiment of a process for receiving a communication. At 702, a real time video to be at least in part embedded substantially in real time into a virtual environment is captured. In various embodiments, embedding at least a part of the real time video into the virtual environment includes performing at least a portion of the process of FIG. 5. In some embodiments, capturing the real time video is described above in association with FIG. 4. For example, capturing the real time video includes using camera 408 of FIG. 4 to capture subject 402 against background 404 lit by lighting 406. By embedding at least a portion of the real time video substantially in real time, a user in the virtual environment is able to view the embedded video as the real time video is being captured. For example, a real time communication between the user and a subject of the real time video can be performed at least in part via the embedded video. The real time embedding may be associated with a time delay. For example, the real time embedding can be affected by a data transfer time delay, a buffering time delay, and/or a processing time delay.

At 704, a communication directed to the embedded video is received from a user viewing in the virtual environment the embedded video. The communication is sent via a communication channel provided in the virtual environment. In various embodiments, the communication includes one or more of the following: a text communication, a voice communication, and a gesture communication. At 706, the communication is forwarded to one or more subjects of the embedded video. In some embodiments, forwarding the communication includes displaying/projecting a text communication, a voice communication, and/or a gesture communication to one or more subjects of the embedded video. For example, forwarding the communication to one or more subjects of the embedded video includes displaying the communication on a screen such as screen 412 of FIG. 4 that is viewable by any subject being filmed for the real time video. The screen displays a chat session and a field of view of the virtual environment that includes one or more representations of the user and any other users in the field of view.

In some embodiments, the user sends the communication to the embedded video in an attempt to communicate with a subject of the embedded video. The subject communicates back to the user at least in part via the real time video. For example, the user sends a text message to the subject, and the subject sends a voice and/or a gesture response via the real time video. In some embodiments, any user in the virtual environment watching the embedded video may watch and/or hear the response by subject. In some embodiments, only the user that sent the communication may watch and/or hear the response by the subject. In some embodiments, the user is represented in the virtual environment as an avatar, but the subject is not represented in the virtual world as an avatar. The subject is only represented in the virtual environment by the embedded video Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method of generating combined content suitable for including in a virtual environment, comprising:
    inputting a background associated with the virtual environment, wherein the virtual environment includes a computer generated three-dimensional graphical environment that can be navigated by a user, wherein navigating in the virtual environment by the user includes navigating as an avatar in the virtual environment;

capturing a live subject, including gestures and movements of the live subject, in a real time video;

using a processor to combine the background with the real time video to generate combined content suitable for including in the virtual environment;

placing at least a portion of the combined content at a location and an orientation within the computer generated three-dimensional environment in a manner that allows the live subject captured in the real time video to appear immersed in the computer generated three-dimensional graphical environment as a virtual representation of the subject;

receiving a communication directed to the live subject from the user, wherein the communication includes communication that is communicated through the avatar; and providing a screen for the live subject captured in the real time video to view the communication as the real time video is being captured, wherein the live subject is enabled to communicate back to the user in response to the communication via the real time video capturing the gestures and movements of the live subject that appears as the virtual representation, and to view simultaneously the computer generated three-dimensional graphical environment from a point-of-view of the virtual representation of the subject appearing immersed in the computer generated three-dimensional graphical environment, including viewing the avatar navigating in the virtual environment.

2. The method as recited in claim 1, wherein the real time video includes the subject against a chroma key background.

3. The method as recited in claim 2, wherein combining the background with the real time video includes replacing a chroma key background portion of the real time video with at least a portion of the background.

4. The method as recited in claim 3, wherein the chroma key background portion of the real time video is detected at least in part by determining which portion of the real time video is associated with a specified range of chroma key colors.

5. The method as recited in claim 1, wherein each of one or more subjects of the real time video appear to the user of the virtual environment as a separate virtual object existing in the virtual environment.

6. The method as recited in claim 1, wherein the virtual environment user is able to interact live with the life subject of the real time video.

7. The method as recited in claim 1, wherein the real time video includes a musical performance.

8. The method as recited in claim 1, wherein the combined content is encoded in a format suitable for streaming to one or more clients rendering the virtual environment.

9. The method as recited in claim 1, wherein the real time video includes a chroma key colored object occluding the subject of the real time video.

10. The method as recited in claim 9, wherein the occluding object in the live video is processed to be replaced with a replacement content.

11. The method as recited in claim 1, wherein the subject in the real time video is lit by a real life light source configured in a manner that substantially reproduces lighting effects of a virtual environment light source on a virtual environment location associated with a virtual environment placement location of the combined content.

12. The method as recited in claim 1, wherein the background is at least in part obtained from the virtual environment.

13. The method as recited in claim 1, wherein the background includes as least a portion of an image captured from one or more of the following: the virtual environment and a virtual object to be included in the virtual environment.

14. The method as recited in claim 1, wherein the background includes one or more of the following: an image content, a video content, an animation content, a text content, and a virtual environment content.

15. The method as recited in claim 1, wherein combining the background image with the real time video includes adjusting on the real live video or the background one or more of the following: a scale, a color, and a cropping.

16. The method as recited in claim 1, wherein combining the background image with the real time video includes compositing the background image with the real time video.

17. The method as recited in claim 1, wherein the combined content is associated with a virtual environment object.

18. The method as recited in claim 17, wherein associating the combined content with the virtual environment object includes adjusting a scale, a position, a color, or a cropping of the combined content with respect to the virtual environment object.

19. The method as recited in claim 17, wherein associating the combined content with the virtual environment object includes adjusting the combined content to substantially match the background of the combined content with at least a portion of the virtual environment object.

20. The method as recited in claim 1, wherein at least a portion of an edge of the combined content is processed to better blend in with the virtual environment or a virtual environment object.

21. The method as recited in claim 20, wherein processing the portion of the edge includes blurring the edge.

22. The method as recited in claim 1, wherein the subject of the real time video appears to be immersed in the virtual environment at least in part due to one or more of the following: a determined camera angle used to produce the live video, a determined magnification used to produce the live video, a virtual environment location associated at least a portion of the combined content, and an arrangement of one or more objects in the virtual environment.

23. The method as recited in claim 1, wherein a communication between the avatar and the subject includes one or more of the following: a gesture by the avatar, a gesture by the subject, a text based chat, and a voice based chat.

24. The method as recited in claim 1, wherein the screen displays one or more of the following: the virtual environment, a virtual environment object, a representation of the virtual environment user, and a chat session.

25. A system for generating combined content suitable for including in a virtual environment, comprising:

a processor configured to:

receive a background associated with the virtual environment, wherein the virtual environment includes a computer generated three-dimensional graphical environment that can be navigated by a user, wherein navigating in the virtual environment by the user includes navigating as an avatar in the virtual environment;

capture a live subject, including gestures and movements of the live subject, in a real time video;

combine the background with the real time video to generate combined content suitable for including in the virtual environment;

place at least a portion of the combined content at a location and an orientation within the computer generated three-dimensional environment in a manner that allows the live subject captured in the real time video to appear immersed in the computer generated three-dimensional graphical environment as a virtual representation of the subject;

receive a communication directed to the live subject from the user, wherein the communication includes communication that is communicated through the avatar; and provide a screen for the live subject captured in the real time video to view the communication as the real time video is being captured, wherein the live subject is enabled to communicate back to the user in response to the communication via the real time video capturing the gestures and movements of the live subject that appears as the virtual representation, and to view simultaneously the computer generated three-dimensional graphical environment from a point-of-view of the virtual representation of the subject appearing immersed in the computer generated three-dimensional graphical environment, including viewing the avatar navigating in the virtual environment; and a memory coupled with the processor, wherein the memory is configured to provide the processor with instructions.

26. A computer program product for generating combined content suitable for including in a virtual environment, the computer program product being embodied in a non-transitory computer readable medium and comprising computer instructions for:

inputting a background associated with the virtual environment, wherein the virtual environment includes a computer generated three-dimensional graphical environment that can be navigated by a user, wherein navigating in the virtual environment by the user includes navigating as an avatar in the virtual environment;

capturing a live subject, including gestures and movements of the live subject, in a real time video;

combining the background with the real time video to generate combined content suitable for including in the virtual environment;

placing at least a portion of the combined content at a location and an orientation within the computer generated three-dimensional environment in a manner that allows the live subject captured in the real time video to appear immersed in the computer generated three-dimensional graphical environment as a virtual representation of the subject;

receiving a communication directed to the live subject from the user, wherein the communication includes communication that is communicated through the avatar; and providing a screen for the live subject captured in the real time video to view the communication as the real time video is being captured, wherein the live subject is enabled to communicate back to the user in response to the communication via the real time video capturing the gestures and movements of the live subject that appears as the virtual representation, and to view simultaneously the computer generated three-dimensional graphical environment from a point-of-view of the virtual representation of the subject appearing immersed in the computer generated three-dimensional graphical environment, including viewing the avatar navigating in the virtual environment.

27. A method of providing communication between a user and an embedded video, comprising:

capturing a real time video to be at least in part embedded substantially in real time into a virtual environment, wherein the virtual environment includes a computer generated three-dimensional graphical environment that can be navigated by the user, wherein navigating in the virtual environment by the user includes navigating as an avatar in the virtual environment;

placing at least a portion of the real time video at a location and an orientation within the computer generated three-dimensional environment in a manner that allows a subject captured in the real time video to appear immersed in the computer generated three-dimensional graphical environment as a virtual representation of the subject;

providing a screen for the subject captured in the real time video to view as the real time video is being captured the computer generated three-dimensional graphical environment from a point-of-view of the virtual representation of the subject appearing immersed in the computer generated three-dimensional graphical environment, including viewing the avatar navigating in the virtual environment;

receiving a communication directed to the embedded video from the user viewing in the virtual environment the embedded video, wherein the communication is sent via a communication channel provided in the virtual environment, and wherein the communication includes communication that is communicated through the avatar; and using a processor to forward the communication to one or more subjects of the embedded video, wherein the one or more subjects are enabled to communicate back to the user in response to the communication via the real time video that appears as the virtual representation.

28. The method as recited in claim 27, wherein the user sends the communication directed to the embedded video in an attempt to communicate with the one or more subjects of the embedded video.

29. The method as recited in claim 27, wherein the communication includes a real time communication.

30. The method as recited in claim 27, wherein the communication includes one or more of the following: a text communication, a voice communication, and a gesture communication.

31. The method as recited in claim 27, wherein forwarding the communication includes displaying at least a portion of the communication on the screen viewable by any subject being filmed for the real time video.

32. The method as recited in claim 31, wherein the screen displays a field of view of the virtual environment, and the field of view includes one or more representations of the user and any other users in the field of view.

33. The method as recited in claim 31, wherein the screen displays a chat session.

34. A system for providing communication between a user and an embedded video, comprising:

a processor configured to:

capture a real time video to be at least in part embedded substantially in real time into a virtual environment, wherein the virtual environment includes a computer generated three-dimensional graphical environment that can be navigated by the user, wherein navigating in the virtual environment by the user includes navigating as an avatar in the virtual environment;

place at least a portion of the real time video at a location and an orientation within the computer generated three-dimensional environment in a manner that allows a subject captured in the real time video to appear immersed in the computer generated three-dimensional graphical environment as a virtual representation of the subject; and provide a screen for the subject captured in the real time video to view as the real time video is being captured the computer generated three-dimensional graphical environment from a point-of-view of the virtual representation of the subject appearing immersed in the computer generated three-dimensional graphical environment, including viewing the avatar navigating in the virtual environment; and a communication interface configured to receive a communication directed to the embedded video from the user viewing in the virtual environment the embedded video, wherein the communication is sent via a communication channel provided in the virtual environment, and wherein the communication includes communication that is communicated through the avatar;

wherein the communication is forwarded to one or more subjects of the embedded video, and wherein the one or more subjects are enabled to communicate back to the user in response to the communication via the real time video that appears as the virtual representation.

35. A computer program product for providing communication between a user and an embedded video, the computer program product being embodied in a non-transitory computer readable medium and comprising computer instructions for:

capturing a real time video to be at least in part embedded substantially in real time into a virtual environment, wherein the virtual environment includes a computer generated three-dimensional graphical environment that can be navigated by the user, wherein navigating in the virtual environment by the user includes navigating as an avatar in the virtual environment;

placing at least a portion of the real time video at a location and an orientation within the computer generated three-dimensional environment in a manner that allows a subject captured in the real time video to appear immersed in the computer generated three-dimensional graphical environment as a virtual representation of the subject;

providing a screen for the subject captured in the real time video to view as the real time video is being captured the computer generated three-dimensional graphical environment from a point-of-view of the virtual representation of the subject appearing immersed in the computer generated three-dimensional graphical environment, including viewing the avatar navigating in the virtual environment;

receiving a communication directed to the embedded video from the user viewing in the virtual environment the embedded video, wherein the communication is sent via a communication channel provided in the virtual environment; and forwarding the communication to one or more subjects of the embedded video, wherein the one or more subjects are enabled to communicate back to the user in response to the communication via the real time video that appears as the virtual representation, and wherein the communication includes communication that is communicated through the avatar.

* * * * *